US011057430B2

(12) United States Patent
Bhargava et al.

(10) Patent No.: US 11,057,430 B2
(45) Date of Patent: Jul. 6, 2021

(54) SERVER-INITIATED SECURE SESSIONS (71) Applicant: JumpCloud, Inc., Boulder, CO (US)

(72) Inventors: Rajat Bhargava, Boulder, CO (US); Christopher Marie, Boulder, CO (US); James Brown, Broomfield, CO (US)

(73) Assignee: JumpCloud, Inc., Louisville, CO (US)

( * ) Notice: Subject to any disclaimer, the term of this patent is extended or adjusted under 35 U.S.C. 154(b) by 132 days.

(21) Appl. No.: 16/155,720

(22) Filed: Oct. 9, 2018

(65) Prior Publication Data

US 2019/0109876 A1  Apr. 11, 2019

Related U.S. Application Data

(60) Provisional application No. 62/569,959, filed on Oct. 9, 2017.

(51) Int. Cl.
*H04L 29/06* (2006.01)
*H04L 29/08* (2006.01)

(52) U.S. Cl.
CPC .............. *H04L 63/18* (2013.01); *H04L 63/02* (2013.01); *H04L 63/029* (2013.01); *H04L 63/0272* (2013.01); *H04L 63/0464* (2013.01); *H04L 67/142* (2013.01); *H04L 67/42* (2013.01); *H04L 63/045* (2013.01); *H04L 63/16* (2013.01); *H04L 63/166* (2013.01); *H04L 63/168* (2013.01); *H04L 67/02* (2013.01)

(58) Field of Classification Search
CPC ....... H04L 63/18; H04L 67/142; H04L 63/02; H04L 63/16; H04L 63/168
USPC ............................................................ 726/3
See application file for complete search history.

(56) References Cited

U.S. PATENT DOCUMENTS

| 9,893,883 | B1* | 2/2018 | Chaubey | H04L 63/061 |
| 2014/0195797 | A1* | 7/2014 | du Toit | H04L 63/0428 |
| | | | | 713/152 |
| 2015/0106442 | A1* | 4/2015 | Baldachin | H04L 67/2823 |
| | | | | 709/203 |
| 2016/0219018 | A1* | 7/2016 | Raman | H04L 63/101 |

* cited by examiner

*Primary Examiner* — Evans Desrosiers
(74) *Attorney, Agent, or Firm* — Holland & Hart LLP (57) ABSTRACT

Methods, systems, and devices for server-initiated secure sessions are described, A browser application may connect to a portal, where the portal may transmit a command to a server agent to initiate a secure session with an endpoint device. The server agent may be housed in a destination server, and may establish a secure connection with an intermediary server using a secure communication protocol. The secure connection may be made by directing the destination server to open an outbound connection through a firewall of the destination server, A browser session may be redirected to the intermediary server from the browser application, and the intermediary server may route the browser session traffic to the secure connection.

19 Claims, 7 Drawing Sheets

SERVER-INITIATED SECURE SESSIONS

CROSS REFERENCE

The present Application for Patent claims the benefit of U.S. Provisional Patent Application No. 62/569,959 by Bhargava et al., entitled "SERVER-INITIATED SECURE SESSIONS", filed Oct. 9, 2017, assigned to the assignee hereof, and expressly incorporated by reference in its entirety.

BACKGROUND

Various attempts have been made to provide a user with a secure session that minimizes the risk of a malicious entity gaining access to the session. Some solutions have included a browser-based Secure Shell (SSH) connection. This type of SSH connection allows a user to remotely access computers that may be at a different physical location. However, these browser-based SSH connections require the passing of credentials from the browser to the destination server via an intermediate machine. This usually restricts users to a less-secure password-based authentication, since there is no clear and simple mechanism for passing public-key credentials into the browser. Also, due to the credentials passing through the intermediate machine, the credentials are open to inspections by the intermediate machine.

Another issue with browser-based SSH connections is that the destination server must be configured to accept SSH protocol traffic from the intermediate machine. Doing so requires a pre-configuration of the destination server firewall to have an in-bound port (e.g., port 22) be open. For some security-conscious businesses or entities, opening an in-bound firewall port may not be preferable or possible. Techniques for securely connecting a server to a browser without transmitting less-secure credentials or opening any in-bound firewall ports may thus increase security in a session.

SUMMARY

Methods, systems, and devices that support server-initiated secure sessions are described. Within a networked, cloud-based computing system, a server agent may facilitate server-initiated secure sessions for users of the computing system. The server agent, which may also be referred to as an agent, may be installed on a destination server of which an endpoint device may target to access. The server agent may receive a command from a portal to which the user is connected which directs the server agent to initiate a secure session with the endpoint device. The server agent may establish a secure connection with an intermediary server, and the intermediary server may route redirected browser session traffic from the endpoint device to the secure connection.

A method of secure communication in a computer network is described. The method may include receiving a command to initiate a secure connection with an intermediary server at a server agent installed on a destination server that includes data targeted by an endpoint device, transmitting a message to initiate the secure connection from the server agent to the intermediary server in response to the command, and communicating with the endpoint device via the intermediary server using at least one secure communication protocol.

A system for secure communication in a computer network is described. The system may include an agent installed on a destination server that includes data targeted by an endpoint device and that is operable to receive a command to initiate a secure connection with an intermediary server, transmit a message to initiate the secure connection to the intermediary server in response to the command, and communicate with the endpoint device via the intermediary server using at least one secure communication protocol.

A non-transitory computer readable medium for secure communication in a computer network is described. The non-transitory computer-readable medium may include instructions operable to cause a processor to receive a command to initiate a secure connection with an intermediary server at a server agent installed on a destination server that includes data targeted by an endpoint device, transmit a message to initiate the secure connection from the server agent to the intermediary server in response to the command, and communicate with the endpoint device via the intermediary server using at least one secure communication protocol.

In some examples of the method, system, and non-transitory computer-readable medium described above, transmitting the message to initiate the secure connection from the server agent to the intermediary server comprises: directing the destination server to open an out-bound connection through a firewall of the destination server.

Some examples of the method, system, and non-transitory computer-readable medium described above may further include processes, features, means, or instructions for establishing a communication path from the server agent to the intermediary server via an out-bound connection through a firewall of the destination server, wherein the command to initiate the secure connection may be received via the communication path.

In some examples of the method, system, and non-transitory computer-readable medium described above, the intermediary server supports a plurality of communication protocols including the at least one secure communication protocol used for the communication with the user.

In some examples of the method, system, and non-transitory computer-readable medium described above, the plurality of secure communication protocols includes at least one of Secure Socket Shell (SSH), Hypertext Transfer Protocol (HTTP) Secure (HTTPS), HTTP over Secure Socket Layer (SSL), or HTTP over Transport Layer Security (TLS).

In some examples of the method, system, and non-transitory computer-readable medium described above, the message to initiate the secure connection comprises credentials associated with the server agent.

A method of secure communication in a computer network is described. The method may include receiving, by an intermediary server, a first message from a server agent installed on a destination server, the first message comprising a request to establish a secure connection between the server agent and the intermediary server; wherein the destination server includes data targeted by an endpoint device, receiving, by the intermediary server, a second message from the endpoint device, the second message comprising a request to establish a second connection between the endpoint device and the server agent, and relaying, by the intermediary server, communications between the destination server and the endpoint device over the secure connection, using at least one secure communication protocol, and the second connection, wherein the relaying is based at least in part on the received first message and the received second message.

A system for secure communication in a computer network is described. The apparatus may include an intermediary server that is operable to receive a first message from a server agent installed on a destination server, the first message comprising a request to establish a secure connection between the server agent and the intermediary server, wherein the destination server includes data targeted by an endpoint device, receive a second message from the endpoint device, the second message comprising a request to establish a second connection between the endpoint device and the server agent, and relay communications between the destination server and the endpoint device over the secure connection, using at least one secure communication protocol, and the second connection, wherein the relaying is based at least in part on the received first message and the received second message.

A non-transitory computer readable medium for secure communication in a computer network is described. The non-transitory computer-readable medium may include instructions operable to cause a processor to receive a first message from a server agent installed on a destination server, the first message comprising a request to establish a secure connection between the server agent and the intermediary server, wherein the destination server includes data targeted by an endpoint device, receive a second message from the endpoint device, the second message comprising a request to establish a second connection between the endpoint device and the server agent, and relay communications between the destination server and the endpoint device over the secure connection, using at least one secure communication protocol, and the second connection, wherein the relaying is based at least in part on the received first message and the received second message.

In some examples of the method, system, and non-transitory computer-readable medium described above, relaying the communications between the server agent and the endpoint device via the intermediary server using at least one secure communication protocol comprises: using a first secure communication protocol to communicate with the server agent and a second secure communication protocol to communicate with the endpoint device.

Some examples of the method, system, and non-transitory computer-readable medium described above, receiving the first message from the server agent at the intermediary server further comprises receiving a communication path at the intermediary server from the server agent via an outbound connection through a firewall.

Some examples of the method, system, and non-transitory computer-readable medium described above may further include processes, features, means, or instructions for redirecting a browser session of the endpoint device to the intermediary server. Some examples of the method, system, and non-transitory computer-readable medium described above may further include processes, features, means, or instructions for connecting traffic from the browser session to the at least one secure communication protocol at the intermediary server.

In some examples of the method, system, and non-transitory computer-readable medium described above, connecting the traffic from the browser session to the at least one secure communication protocol at the intermediary server comprises: converting a format of the traffic from the browser session to a format used by the at least one secure communication protocol.

In some examples of the method, system, and non-transitory computer-readable medium described above, the intermediary server supports a plurality of communication protocols including the at least one secure communication protocol used for the communication with the endpoint device.

In some examples of the method, system, and non-transitory computer-readable medium described above, the plurality of secure communication protocols includes at least one of Secure Socket Shell (SSH), Hypertext Transfer Protocol (HTTP) Secure (HTTPS), HTTP over Secure Socket Layer (SSL), or HTTP over Transport Layer Security (TLS).

Some examples of the method, system, and non-transitory computer-readable medium described above may further include processes, features, means, or instructions for receiving input from an endpoint device at an authentication management console residing on the intermediary server, wherein the received input selects the destination server for communicating with, and transmitting, from the intermediary server to the server agent, a command to initiate a secure connection with the intermediary server based on the received input.

BRIEF DESCRIPTION OF THE DRAWINGS

Aspects of the disclosure are described with reference to the following figures.

DETAILED DESCRIPTION

For an endpoint device to connect to a server using traditional methods, an in-bound port in the server's firewall has to be open. However, leaving an in-bound port in the server's firewall open can make the server vulnerable to malicious attacks, thereby compromising the security of the system. There is, therefore a technical problem of how to increase the security of a server while still allowing for an endpoint device to connect to the server. This technical problem is addressed through the use of a server agent, which may also be referred to as an "agent," coupled to the server which enables a server-initiated secure session for access to the server without requiring an in-bound port in the server's firewall to be open. For instance, an endpoint device may connect to a portal via a browser and may select a server to connect to. The portal may command the agent located on the selected server to initiate a Secure Socket Shell (SSH) connection to an intermediary server. The agent may then initiate a SSH connection with the intermediary server. Subsequently, the endpoint device's browser session may be redirected to the intermediary server, where the intermediary server may then connect the browser traffic to the SSH session. Because the SSH session is initiated by the server via the agent, none of the in-bound firewall ports of the server may be opened to accept traffic flow from the user, thereby maintaining the security of the firewall.

Aspects of the disclosure are initially described below in the context of a system that supports server-initiated secure sessions. Various examples of server-initiated secure sessions, an endpoint device, and a destination server are then described. These and other aspects of the disclosure are further illustrated by and described with reference to apparatus diagrams, system diagrams, and flowcharts that relate to server-initiated secure sessions.

Figure 1:
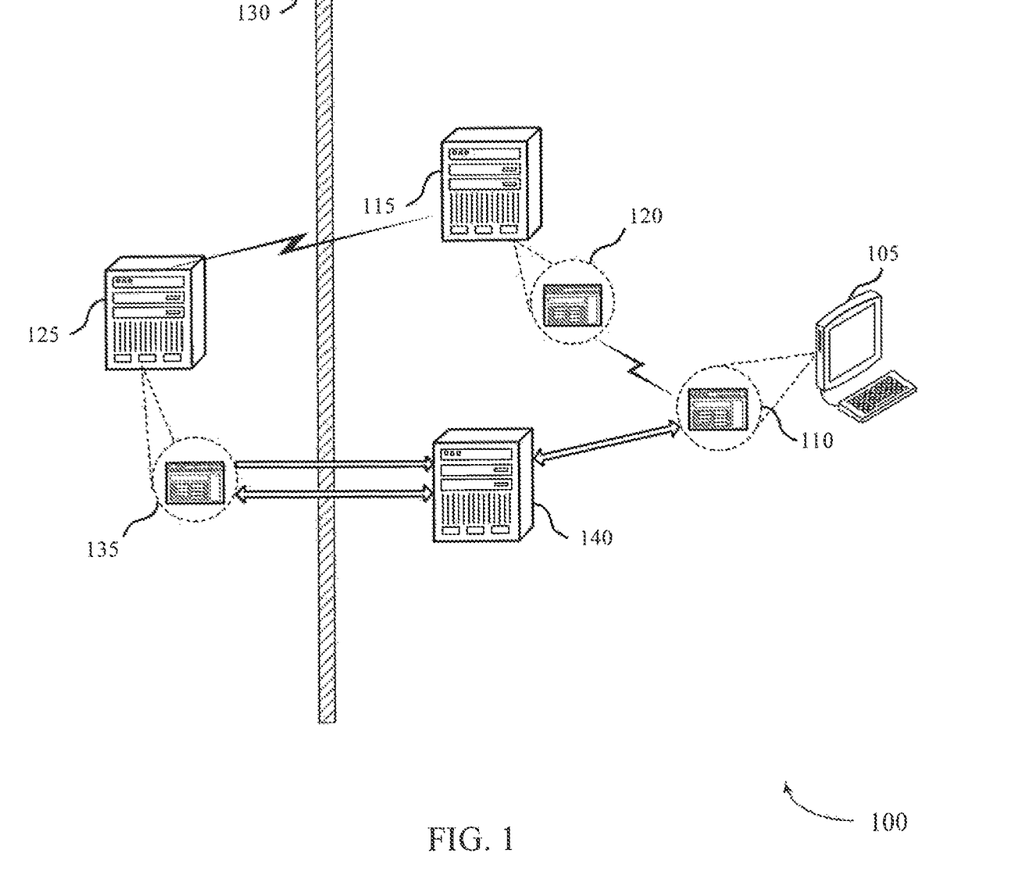
FIG. 1 illustrates an example of a system that supports server-initiated secure sessions in accordance with various aspects of the present disclosure.

FIG. 1 illustrates an example of a system 100 that supports server-initiated secure sessions in accordance with various aspects of the present disclosure. The system 100 includes a destination server 125. The destination server 125 may be protected by a firewall 130, and the firewall 130 may include a set of inbound ports through which traffic may flow into the destination server 125, and a set of outbound ports through which traffic may flow out of the destination server 125. The destination server 125 may also include a server agent 135. The server agent 135 may be an application running on the destination server 125 or a separate hardware device within the firewall 130. The server agent 135 may initiate secure sessions with an endpoint device. An example of the destination server 125 is described in more detail with reference to FIG. 4.

Browser application 110 may be running on an endpoint device 105. The browser application 110 may be a software application for retrieving and presenting information resources on the World Wide Web and may be hosted on or an aspect of the endpoint device 105, which may also be referred to as a user terminal. The browser application 110 may be able to operate across various protocols, such as a (Hyptertext Transfer Protocol (HTTP), and various operating systems. The browser application 110 may additionally maintain a browser session for a user on the endpoint device 105.

The endpoint device 105 may provide a user with access to system 100. The endpoint device 105 may include computing devices of various types (e.g., mobile phones, tablets, notebook computers, desktop computers, servers, etc.), which may utilize various operating systems. A user may operate the endpoint device 105 in an attempt to access the destination server 125 via the browser application 110. The browser application may connect the endpoint device 105 to a portal 120 with a browser session, where the portal 120 may be housed by a server 115. In some embodiments, the features of the server 115 may be performed by an intermediary server 140, or vice versa.

The portal 120 may authenticate the user based on credentials provided by the browser application 110. Alternatively, the server 115 may store user credentials and provide the portal 120 with these credentials when prompted. Examples of user credentials may include a username, a password, a certificate-based key, or any other attribute or credential associated with a user. Authentication of a user may be performed by matching credentials provided by the browser application 110 or the server 115 with a set of credentials for the user on file in a local operating system or within an authentication server. Alternatively, the authentication of the endpoint device 105 may be performed in lieu of, or in combination with, authenticating the user, where credentials of the endpoint device 105 may be matched with credentials for the endpoint device 105 on file in a local operating system or within an authentication server. After authentication, the portal 120 may provide the endpoint device 105 with a list of servers with which to connect to, including, but not limited to, the destination server 125. The list of servers presented may be based on the identity of the endpoint device 105, the user, or a combination thereof. For example, a first user may be provided a list of servers to access that is different than a list of servers presented to a second user. Upon selecting the destination server 125, the portal 120 may communicate with the server agent 135 running on the destination server 125, where the communication may be a command to initiate a secure session with the endpoint device 105. This communication may implement a long-poll mechanism, such as a HTTP long-poll mechanism, which may allow the communication to be performed without an open connection, or establishing a connection, between the server agent 135 and the server 115 or the intermediary server 140. Additionally, this communication may be received by the destination server 125 via an in-bound port of the firewall 130. In some examples, the intermediary server 140 may also house the portal 120, where the portal 120 is managed by an authentication management console stored in the intermediary server 140. The authentication management console may additionally authenticate the user for the portal 120. Additionally or alternatively, the authentication management console may manage a terminal emulator (e.g., a JavaScript terminal emulator) which may convey user keypresses to a software backend, such as a data access layer.

Based on this communication from the portal 120, the server agent 135 may initiate a secure (e.g., SSH) connection with the intermediary server 140. Additionally, the server agent 135 may command the destination server 125 to open an out-bound connection through the firewall 130 in order to communicate with the intermediary server 140 with a secure session. The server agent 135 may initiate this secure session by using its own credentials. For example, the server agent 135 may transmit credentials to the intermediary server 140. The intermediary server 140 may authenticate the server agent 135 based on the received credentials, and may accept or establish the secure session based on the authentication. This authentication process may allow the intermediary server 140 to verify the identity of the server agent 35, and thus verify the destination server 115, prior to establishing a secure connection with the destination server 115. Once the secure session is established between the server agent 135 and the intermediary server 140, the browser session of the endpoint device 105 may then be redirected to the intermediary server 140, where the intermediary server 140 may then connect the browser session traffic from the endpoint device 105 to the secure session. In some examples, the browser application 110 may be prompted by the portal 120 or the server 115 to route the browser session to the intermediary server 140. In some cases, the intermediary server 140 may convert or translate the traffic from the browser session into a protocol compatible with the secure session (e.g., from emulated HTTP to SSH). Thus, a secure connection may be initiated between the destination server 125 and the endpoint device 105 without having to configure any of the in-bound ports of the firewall 130. This server-initiated secure session may therefore reduce the possibility of malicious activity affecting the session while maintaining the security standards and levels for the destination server 125.

Additionally, the intermediary server 140 may support multiple communication protocols simultaneously, including various secure communication protocols. Examples of communication protocols that the intermediary server may support include SSH, Hypertext Transfer Protocol (HTTP)

Secure (HTTPS), HTTP over Secure Socket Layer (SSL), and HTTP over Transport Layer Security (TLS). The ability of the intermediary server 140 to support multiple communication protocols simultaneously may allow the intermediary server 140 to convert or translate the traffic from the browser session into a protocol compatible with the secure session.

The various elements of the system 100, or the devices, components, and elements of the system 100 may be coupled to one another and/or may be in electronic communication with one another. As used herein, "in electronic communication" means a relationship between components that facilitates an exchange of information, signals, waveforms, electrons, and the like.

The various elements, components, servers and devices of the system 100 may be connected to one another wirelessly or with wired connections. In some cases, they are connected via the Internet. Communication between the various devices may utilize Transport Layer Security (TLS), Secure Sockets Layer (SSL), or some other security or encryption protocol. As used herein, the term server refers to a computer or program in a network that provides services, including access to applications, files, peripherals, etc., to other computers or programs, or consoles within a network. As discussed below, this may include both software and hardware, and real and virtual machines. In some examples, a server is a computer program that operates to support or perform tasks on behalf of other programs, computers, or users. Further, as used herein, a server may include a "rack" or enclosure housing computer hardware and software.

The system 100 may thus support server-initiated secure sessions. This may be accomplished, in part, with an agent hosted in a destination server, which may facilitate authentication and authorization for user access of the destination server by initiating a secure session with the user.

Figure 2:
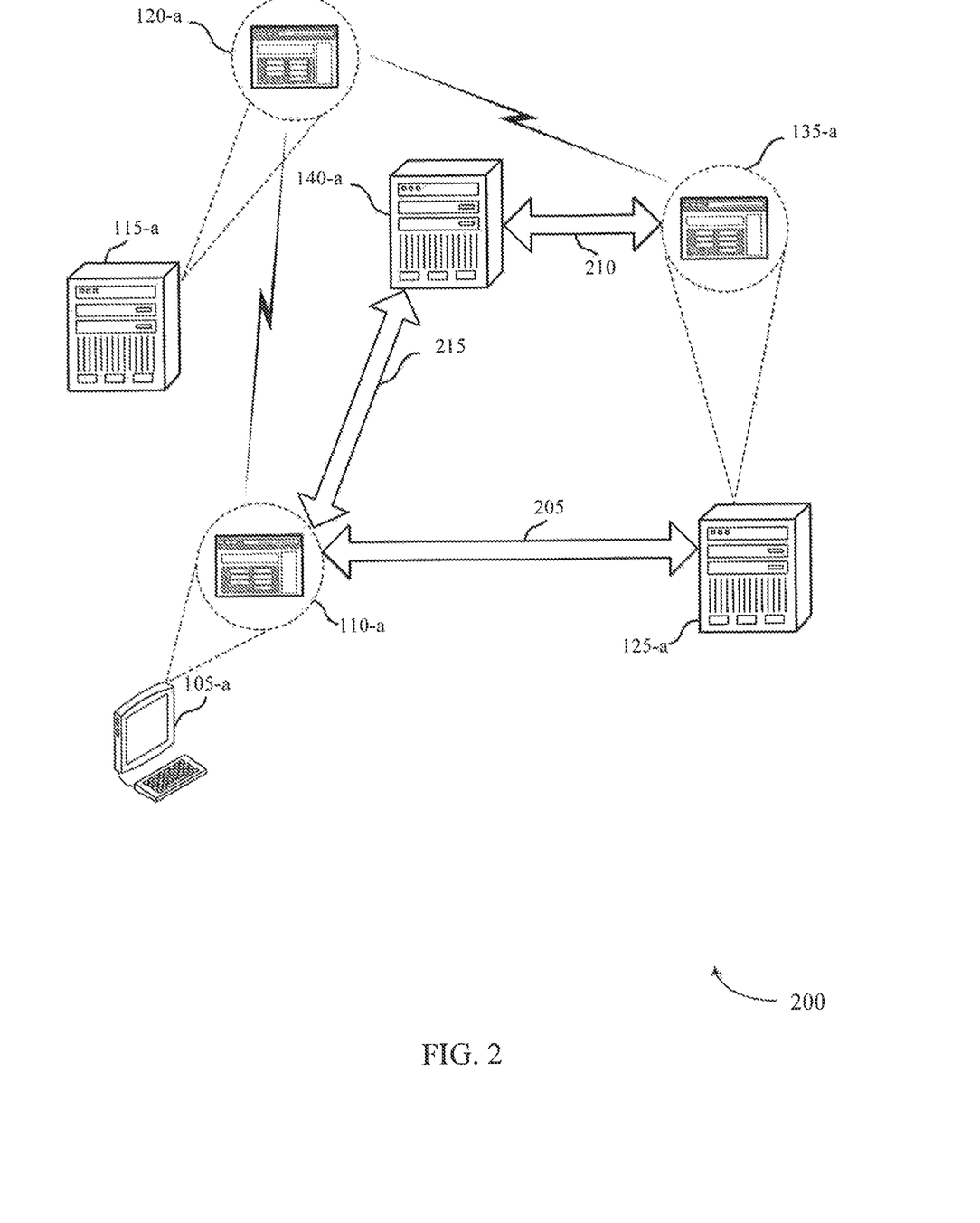
FIG. 2 illustrates an example of a user perspective for server-initiated secure sessions in accordance with various aspects of the present disclosure.

FIG. 2 depicts an example 200 of a user perspective for server-initiated secure sessions in a system, in accordance with various aspects of the present disclosure. The browser application 110-*a* may be an example of the browser application 110 of the system 100 and may be hosted on an endpoint device 105-*a*, which may facilitate communication with a destination server 125-*a* via a server agent 135-*a*. The destination server 125-*a* and the server agent 135-*a* may be examples of the destination server 125 and the server agent 135, as described with reference to FIG. 1. Additionally, a portal 120-*a* may be an example of the portal 120 of the system 100 and may be hosted by a server 115-*a*, which may be an example of the server 115 or the intermediary server 140 of the system 100. The browser application 110-*a* may provide content to a user via a device, such as the endpoint device 105 of the system 100. When a user attempts to gain access to the destination server 125-*a* via the browser application 110-*a*, the user may receive access to the destination server 125-*a* via an out-bound connection through the firewall of the destination server 125-*a*. Thus, from the perspective of the user, the browser application 110-*a* may seamlessly communicate with the destination server 125-*a* via communication link 205.

However, the destination server 125-*a* may receive a command to initiate a secure session from the portal 120-*a*, and the intermediary server 140-*a* may receive redirected browser session traffic from the browser application 110-*a* through a communication link 215, and a secure connection from the destination server 125-*a* through a communication link 210. The intermediary server 140-*a* may then redirect the browser session traffic to the secure connection. In this way, security mechanisms that are in place to protect the destination server 125-*a* may still be met while communicating with the device 105-*a*.

Figure 3:
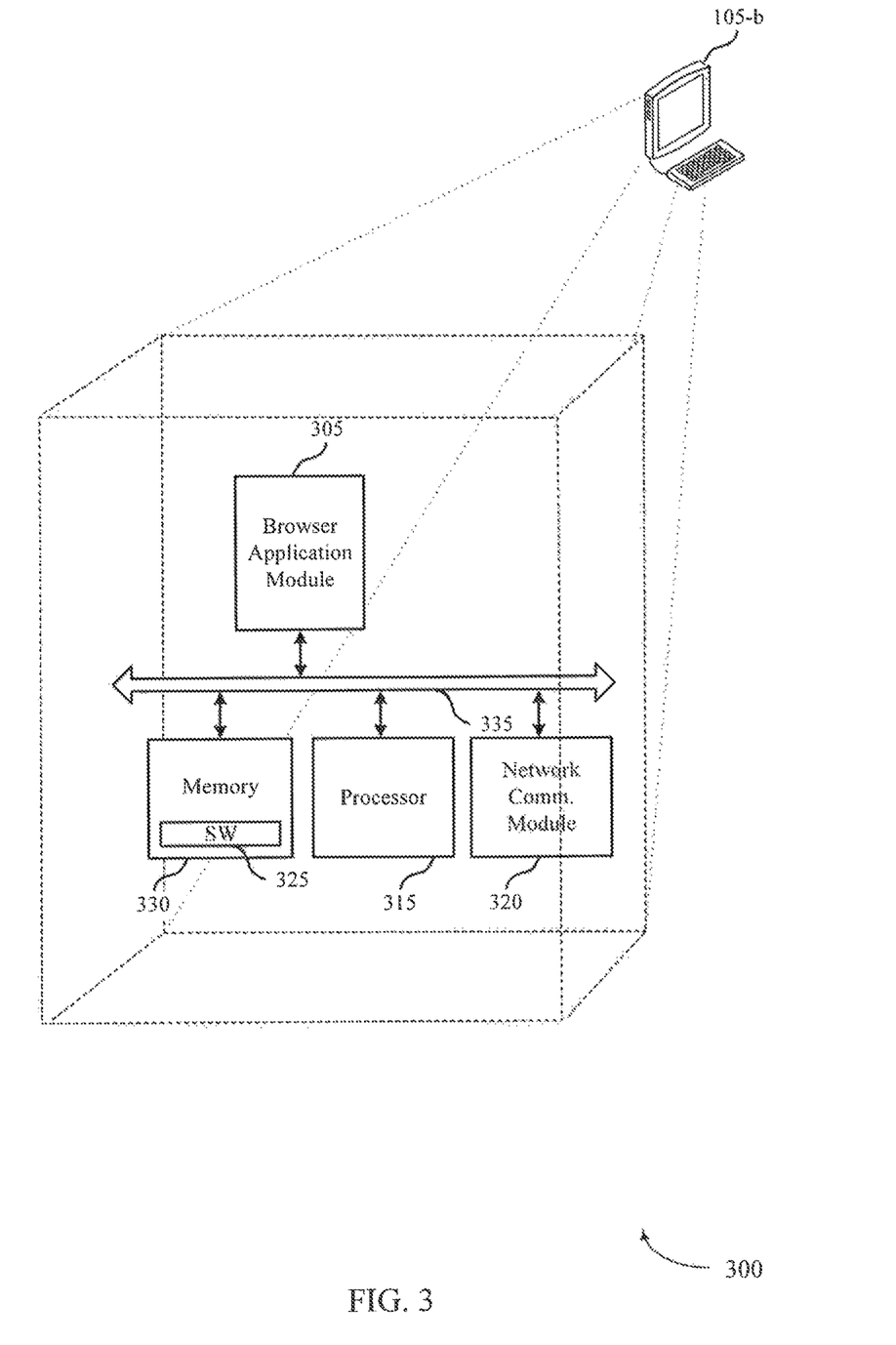
FIG. 3 illustrates an example of a device that supports server-initiated secure sessions in accordance with various aspects of the present disclosure.

FIG. 3 illustrates an example 300 of an endpoint device 105-*b* that supports server-initiated secure sessions in accordance with various aspects of the present disclosure. The endpoint device 105-*b* may be an example of the endpoint device 105 described with reference to FIGS. 1 and 2, and may include a browser application module 305.

The browser application module 305 may facilitate communication with a browser application 110 (e.g., via a browser plug-in) and may, in combination with other components of the endpoint device 105-*b*, assist in selecting a destination server to communicate with, redirect the browser session traffic to an intermediary server, and route the browser session traffic to a secure connection with the destination server, as described with reference to FIGS. 1 and 2.

The endpoint device 105-*b* may include a processor 315, memory 330 (including software/firmware (SW) 325), and a network communications module 320. The various modules of the endpoint device 105-*b* may be in communication via one or more buses 335. The network communications module 320 may be configured for secure, bi-directional communication with other devices, servers, and the like in a system, such as the system 100 of FIG. 1, via one or more wired or wireless links. For example, the network communications module 320 may include a modem configured to modulate packets and transmit them to, and to demodulate received packets.

The memory 330 may include random access memory (RAM) and read only memory (ROM). The memory 330 may store computer-readable, computer-executable software/firmware code 325, including instructions that, when executed, cause the processor 315 to perform various functions described herein (e.g., facilitating server-initiated secure sessions). Alternatively, the software/firmware code 325 may not be directly executable by the processor 315 but cause a computer (e.g., when compiled and executed) to perform functions described herein. The processor 315 may include an intelligent hardware device, (e.g. a central processing unit (CPU), a microcontroller, an ASIC, etc.).

Figure 4:
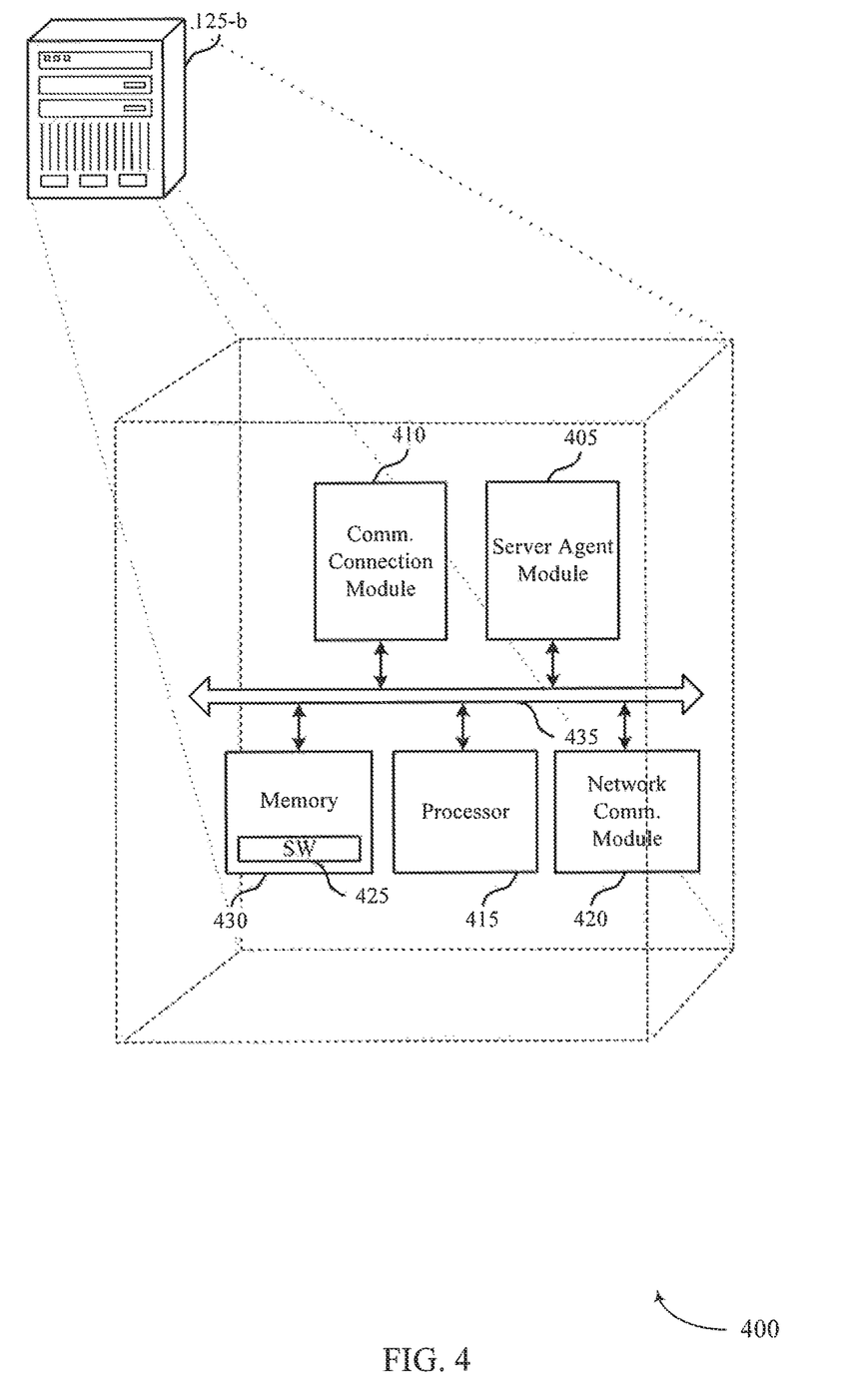
FIG. 4 illustrates an example of a central server that supports server-initiated secure sessions in accordance with various aspects of the present disclosure.

FIG. 4 illustrates an example 400 of a destination server 125-*b* that supports server-initiated secure sessions in accordance with various aspects of the present disclosure. The destination server 125-*b* may be an example of the destination server 125 with reference to FIG. 1, and may include a server agent module 405 and a communication connection module 410.

The server agent module 405 may be an example of the server agent 135 of FIG. 1 and may facilitate server-initiated secure sessions as described with reference to FIG. 1. The server agent module 405 may be a hardware module or a software module, or a combination of hardware and software (e.g., a special-purpose processor). The server agent module 405 may, in some cases and in combination with other components of the destination server 125-*b*, initiate a secure connection with an intermediary server based on a received command from a portal, and receive routed browser session traffic through the secure connection, as described with reference to FIG. 1.

The communication connection module 410 may open an out-bound connection through a firewall for the destination server 125-*b* based on a received command to initiate a secure session, as described with reference to FIG. 1.

The destination server 125-*b* may include a processor 415, memory 430 (including software/firmware (SW) 425), and a network communications module 420. The various modules of the destination server 125-*b* may be in communication via one or more buses 435. The network communications module 420 may be configured for secure, bi-directional communication with other devices, servers, and the like in a system, such as system 100 of FIG. 1, via one or more wired or wireless links. For example, the network communications module 420 may include a modem configured to modulate packets and transmit them to, and to demodulate received packets.

The memory 430 may include random access memory (RAM) and read only memory (ROM). The memory 430 may store computer-readable, computer-executable software/firmware code 425, including instructions that, when executed, cause the processor 415 to perform various functions described herein (e.g., facilitating server-initiated secure sessions). Alternatively, the software/firmware code 425 may not be directly executable by the processor 415 but cause a computer (e.g., when compiled and executed) to perform functions described herein. The processor 415 may include an intelligent hardware device, (e.g., a central processing unit (CPU), a microcontroller, an ASIC, etc.).

Figure 5:
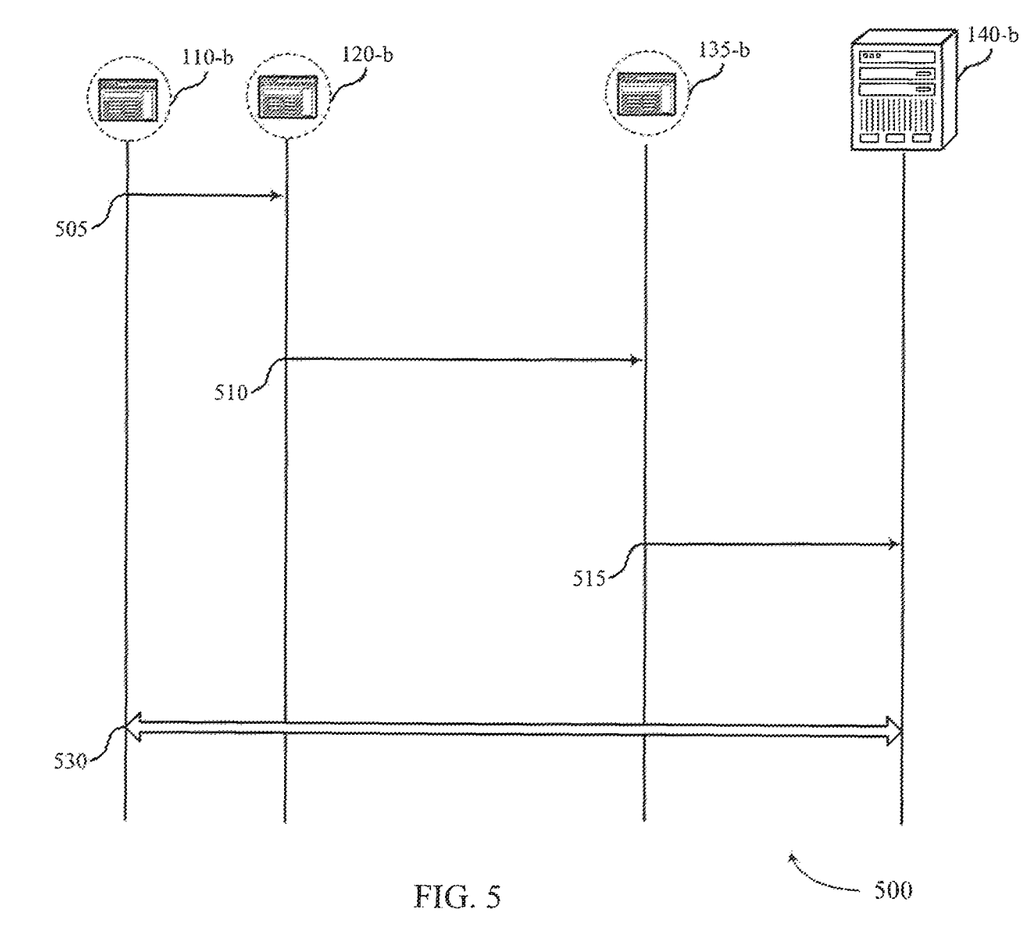
FIG. 5 illustrates an example of a process flow in a system that supports server-initiated secure sessions in accordance with various aspects of the present disclosure.

FIG. 5 illustrates an example of a process flow 500 in a system, such as system 100 of FIG. 1, that supports server-initiated secure sessions in accordance with various aspects of the present disclosure. The process flow 500 may include a browser application 110-*b*, a portal 120-*b*, a server agent 135-*b*, and intermediary server 140-*b*. Each of these may be examples of corresponding devices, entities, and the like, described with reference to FIGS. 1-4.

At 505, the browser application 110-*b*, hosted at an endpoint device, may connect to a portal 120-*b*. The connection may be made after the portal 120-*b* authenticates the user. Authentication credentials may be passed from the browser application 110-*b* to portal 120-*b*, or a server hosting the portal 120-*b* may alternatively store the authentication credentials for the user. Additionally or alternatively, once the connection is made, the user may select a destination server, which houses targeted data, to securely connect to. In some embodiments, the selected destination server may be selected from a list of available servers to securely connect to.

At 510, the portal 120-*b* may transmit a command to the server agent 135-*b* to initiate a secure connection to the browser application 110-*b*. The server agent 135-*b* may be as described with reference to FIGS. 1-3.

At 515, in response to the received command, the server agent 135-*b* may connect to the intermediary server 140-*b*. The connection may be made by initially transmitting a message to the intermediary server 140-*b*, the message including a request to establish a connection with the intermediary server 140-*b*. Additionally, the server agent 135-*b* may connect to the intermediary server 140-*b* by directing the destination server in which the server agent 135-*b* is housed to open an out-bound connection through the firewall of the destination server. The connection may be in a secure communication protocol. Examples of a secure communication protocol for the connection include Secure Socket Shell (SSH), Hypertext Transfer Protocol (HTTP) Secure (HTTPS), HTTP over Secure Socket Layer (SSL), and HTTP over Transport Layer Security (TLS).

At 520, the intermediary server 140-*b* may receive a redirected browser session from the browser application 110-*b*, and route the browser session traffic to the connection made with the server agent 135-*b*. The intermediary server 140-*b* may receive a message requesting to establish communications with the intermediary server 140-*b* before the browser traffic is routed. In some examples, the routing of the browser session traffic may include converting or translating the traffic into a compatible communication protocol for the secure connection made with the server agent 135-*b*.

Figure 6:
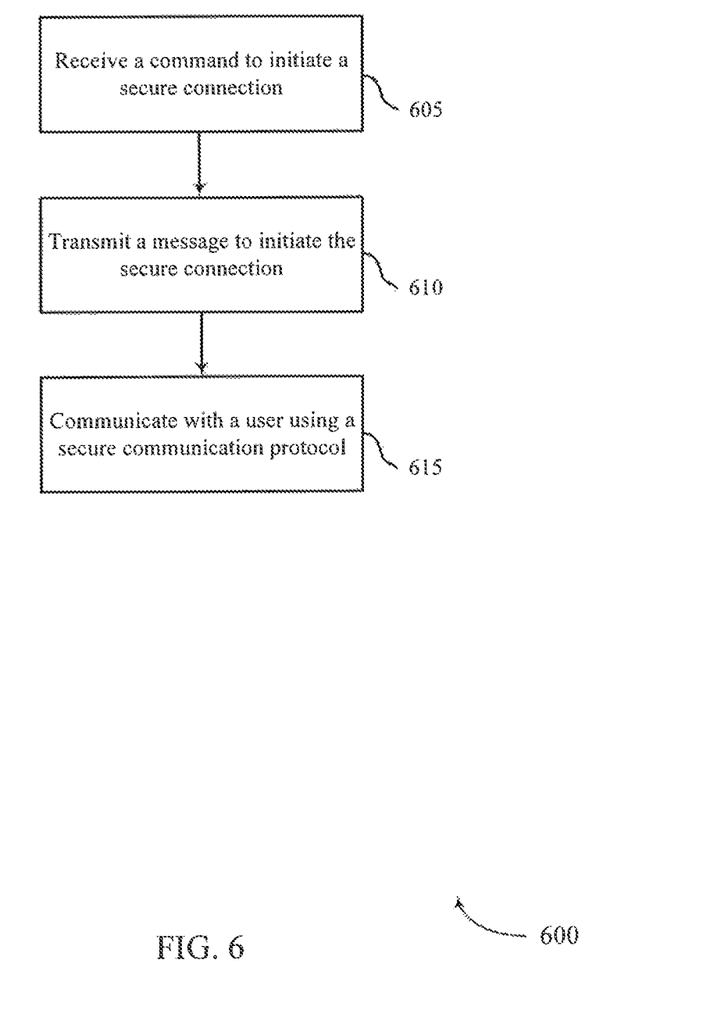
FIGS. 6 and 7 illustrate methods for server-initiated secure sessions in accordance with various aspects of the present disclosure.

FIG. 6 illustrates a method 600 for server-initiated secure sessions in accordance with various aspects of the present disclosure. The operations of the method 600 may be implemented by various servers and devices within a system, as described with reference to FIGS. 1-5. In some examples, one or more servers, such as the destination server 125, may execute a set of codes to control the functional elements of servers and devices with the system 100 to perform the functions described below. Additionally or alternatively, the destination server 125 may perform aspects of the functions described below using special-purpose hardware.

At block 605, a server agent may receive a command to initiate a secure connection with an intermediary server. The server agent may be as described with reference to FIGS. 1-3 and may be installed on a destination server. In some examples, the command may be received from a portal, where the portal is connected to a browser session of a user targeting data held by the destination server. In some examples, the user selects the destination server to access via the portal.

At block 610, the server agent may transmit a message to initiate the secure connection. The message may be transmitted to the intermediary server. In some examples, the message may be transmitted by the destination server opening e.g., configuring) an out-bound connection through a firewall. The intermediary server may be as described with reference to FIGS. 1 and 3.

At block 615, the server agent may communicate with a user using a secure communication protocol. The secure communication protocol may include Secure Socket Shell (SSH), Hypertext Transfer Protocol (HTTP) Secure (HTTPS), HTTP over Secure Socket Layer (SSL), and HTTP over Transport Layer Security (TLS). In certain examples, the operations of blocks 605-615 may be performed by the server agent module 310 as described with reference to FIG. 3.

Figure 7:
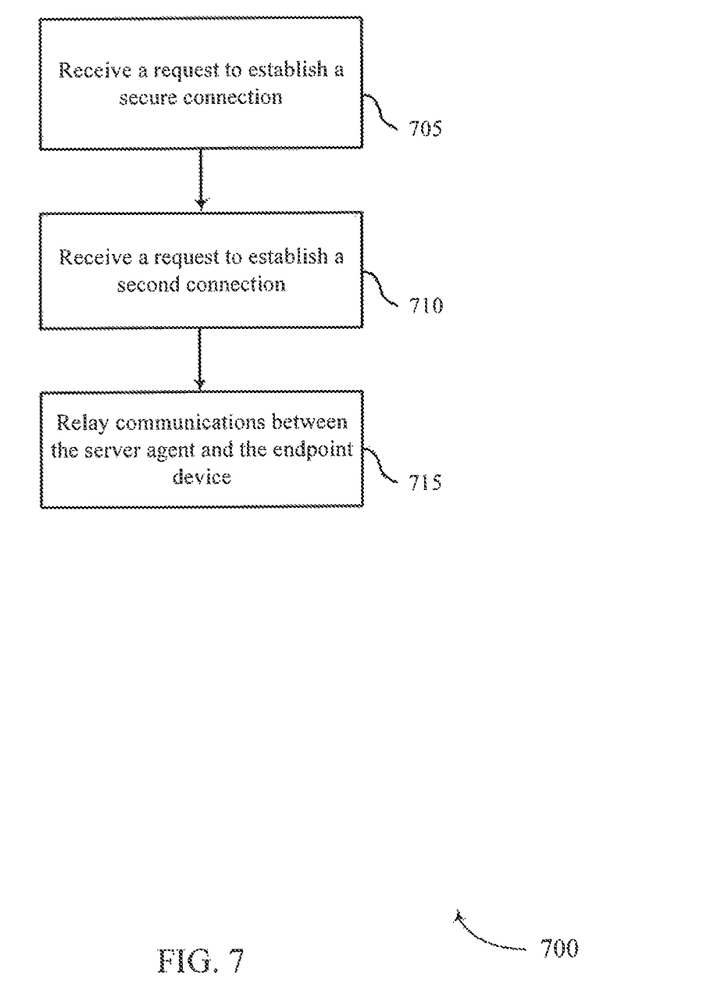

FIG. 7 illustrates a method 700 for server-initiated secure sessions in accordance with various aspects of the present disclosure. The operations of method 700 may be implemented by various servers and devices within a system, as described with reference to FIGS. 1-5. In some examples, one or more servers, such as the intermediary server 140, may execute a set of codes to control the functional elements of servers and devices with the system 100 to perform the functions described below. Additionally or alternatively, the intermediary server 140 may perform aspects the functions described below using special-purpose hardware.

At block 705, an intermediary server may receive a first message comprising a request to establish a secure connection with a server agent. The request may be received from a user of an endpoint device targeting data held on the destination server. In some examples, the request may be received via a portal housed by the intermediary server.

At block 710, the intermediary server may receive a second message from an endpoint device, the second message comprising a request to establish a second connection between the endpoint device and the server agent.

At block 715, the intermediary server may relay communications between the server agent and the endpoint device. In some examples, the intermediary server may route browser session traffic from a browser application of an endpoint device to the secure connection with the server agent based on the first message and the second message. In some examples, the intermediary server may convert or translate the browser session traffic into a compatible format for the secure connection.

Thus, the methods 600 and 700 may provide for server-initiated sessions. It should be noted that the methods 600 and 700 describe possible implementations, and that the operations and the steps may be rearranged or otherwise modified such that other implementations are possible. In some examples, aspects from two or more of the methods 600 and 700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

The description set forth herein, in connection with the appended drawings, describes example configurations and does not represent all the examples that may be implemented or that are within the scope of the claims. The term "exemplary" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method of secure communication in a computer network at a destination server, comprising:

obtaining, at a server agent installed on the destination server and from a portal that is external to the destination server, a first command to initiate a secure connection with an intermediary server, wherein an inbound port of a firewall of the destination server associated with establishing the secure connection with the destination server is dosed when the first command is obtained, and wherein the destination server includes data targeted by an endpoint device;

transmitting, by the server agent based at least in part on the first command, a message to the intermediary server that initiates an establishment of the secure connection between the server agent and the intermediary server and a second command to the destination server to open an outbound port of the firewall of the destination server associated with communicating using the secure connection; and communicating with the endpoint device via the intermediary server using at least one secure communication protocol based at least in part on establishing the secure connection with the intermediary server and opening the outbound port of the firewall of the destination server, wherein:

the inbound port of the firewall of he destination server remains closed during the communicating, and the communicating comprises receiving, from the intermediary server and over the secure connection, traffic associated with a browser session of the endpoint device in accordance with a first format used by the at least one secure communication protocol, the traffic from the browser session being connected to the at least one secure communication protocol based at least hi part on being converted to the first format from a second format associated with the browser session.

2. The method of claim 1, further comprising:
establishing the secure connection between the server agent and the intermediary server based at least in part on transmitting the message, the second command, or both.

3. The method of claim 1, further comprising:
establishing a communication path from the server agent to the intermediary server via an outbound connection through the firewall of the destination server based at least in part on the outbound port of the firewall of the destination server being opened.

4. The method of claim 1, wherein the intermediary server supports a plurality of secure communication protocols including the at least one secure communication protocol used for the communication with the endpoint device.

5. The method of claim 4, wherein the plurality of secure communication protocols includes at least one of Secure Socket Shell (SSH), Hypertext Transfer Protocol (HTTP), Secure (HTTPS), HTTP over Secure Socket Layer (SSL), or HTTP over Transport Layer Security (TLS).

6. The method of claim 1, wherein the message to initiate the secure connection comprises credentials associated with the server agent.

7. A method of secure communication in a computer network at an intermediary server, comprising:
receiving, by the intermediary server, a first message from a server agent installed on a destination server, the first message comprising a first request to establish a first secure connection between the server agent and the intermediary server, wherein an inbound port of a firewall of the destination server associated with establishing the first secure connection with the destination server is closed when the first message is received, and wherein the destination server includes data targeted by an endpoint device;

receiving, by the intermediary server, a second message from the endpoint device, the second message comprising a second request to establish a second secure connection between the endpoint device and the server agent;

receiving, by the intermediary server, communications from the destination server via an outbound port of the firewall of the destination server associated with communicating using the first secure connection based at least in part on establishing the first secure connection, the second secure connection, or both, wherein the first secure connection is associated with a secure communication protocol, and wherein the inbound port of the firewall of the destination server remains closed during the receiving;

connecting, by the intermediary server, traffic from a browser session of the endpoint device to the secure communication protocol based at least in part on establishing the first secure connection, the second secure connection, or both, wherein the connecting comprises converting a first format of the traffic to a second format used by the secure communication protocol; and relaying, by the intermediary server, the communications received from the destination server to the endpoint device over the first secure connection and the second secure connection; wherein the relaying is based at least in part on the first message and the second message.

8. The method of claim 7, wherein relaying the communications between the server agent and the endpoint device via the intermediary server comprises:
using the secure communication protocol to communicate with the server agent and a second secure communication protocol to communicate with the endpoint device.

9. The method of claim 7, further comprising:
establishing a communication path from the server agent to the intermediary server via an outbound connection through the firewall of the destination server based at least in part on the outbound port of the firewall of the destination server being opened.

10. The method of claim 7, further comprising:
redirecting the browser session of the endpoint device to the intermediary server.

11. The method of claim 7, wherein the intermediary server supports a plurality of secure communication protocols including the secure communication protocol used for the communication with the endpoint device.

12. The method of claim 11, wherein the plurality of secure communication protocols includes at least one of Secure Socket Shell (SSH), Hypertext Transfer Protocol (HTTP), Secure (HTTPS) HTTP over Secure Socket Layer (SSL), or HTTP over Transport Layer Security (TLS).

13. The method of claim 7, further comprising:
receiving input from the endpoint device at an authentication management console residing on the intermediary server, wherein the input selects the destination server for communication; and generating, by the intermediary server, a command for initiating a secure connection with the server agent based at least in part on the input, wherein the command is obtained by the server agent.

14. A system for secure communication in a computer network, comprising:
an endpoint device;
an intermediary server; and
a destination server that includes data targeted by the endpoint device, wherein an agent is installed on the destination server and is operable to:
obtain, from a portal that is external to the destination server, a first command to initiate a secure connection with the intermediary server, wherein an inbound port of a firewall of the destination server associated with establishing the secure connection with the destination server is closed when the first command is obtained;

transmit, based at least in part on the first command, a message to the intermediary server that initiates an establishment of the secure connection between the agent and the intermediary server and a second command to the destination server to open an outbound port of the firewall of the destination server associated with communicating using the secure connection; and communicate with the endpoint device via the intermediary server using at least one secure communication protocol based at least in part on establishing the secure connection with the intermediary server and opening the outbound port of the firewall of the destination server, wherein the inbound port of the firewall of the destination server remains closed during the communicating, and wherein the intermediary server is operable to connect traffic from a browser session of the endpoint device to the at least one secure communication protocol based at least hi part on establishing the secure connection, wherein the connecting comprises converting a first format of the traffic to a second format used by the at least one secure communication protocol.

15. The system of claim 14, wherein the agent is further operable to:
    establish the secure connection with the intermediary server based at least in part on transmitting the message, the second command, or both.

16. The system of claim 14, wherein the agent is further operable to:
    establish a communication path to the intermediary server via an outbound connection through the firewall of the destination server based at least in part on the outbound port of the firewall of the destination server being opened.

17. The system of claim 14, wherein the intermediary server is operable to support a plurality of secure communication protocols including the at least one secure communication protocol used for the communication with the endpoint device.

18. The system of claim 17, wherein the plurality of secure communication protocols includes at least one of Secure Socket Shell (SSH), Hypertext Transfer Protocol (HTTP), Secure (HTTPS), HTTP over Secure Socket Layer (SSL), or HTTP over Transport Layer Security (TLS).

19. The system of claim 14, wherein the first command to initiate the secure connection comprises credentials associated with the agent.

* * * * *